United States Patent
Thomassey (10) Patent No.: US 10,240,662 B2
(45) Date of Patent: Mar. 26, 2019

(54) POWER TRANSMISSION GEARBOX AND AN AIRCRAFT

(71) Applicant: AIRBUS HELICOPTERS, Marignane (FR)

(72) Inventor: Lionel Thomassey, Fos Sur Mer (FR)

(73) Assignee: Airbus Helicopters, Marignane (FR)

( * ) Notice: Subject to any disclaimer, the term of this patent is extended or adjusted under 35 U.S.C. 154(b) by 196 days.

(21) Appl. No.: 15/207,779

(22) Filed: Jul. 12, 2016

(65) Prior Publication Data
US 2017/0016513 A1    Jan. 19, 2017

(30) Foreign Application Priority Data

Jul. 16, 2015    (FR) ...................................... 15 01515

(51) Int. Cl.
| | | |
|---|---|---|
| F16H 55/22 | (2006.01) | |
| F02C 7/32 | (2006.01) | |
| F16H 1/12 | (2006.01) | |
| F16H 1/22 | (2006.01) | |
| B64C 27/14 | (2006.01) | |

(Continued)

(52) U.S. Cl.
CPC ............... F16H 1/12 (2013.01); B64C 27/14 (2013.01); F02C 7/32 (2013.01); F16H 55/22 (2013.01); B64D 2033/0213 (2013.01); F05D 2260/4031 (2013.01); F16H 1/222 (2013.01); F16H 2055/173 (2013.01)

(58) Field of Classification Search
CPC ............... F16H 55/22; F16H 2048/385; F16H 2055/173; F16H 1/12; F16H 1/18; F16H 1/203; F16H 1/206; F16H 1/222; F16H 1/006; F16H 35/06; B64D 35/04; B64D 2033/0213; B64C 13/34; B64C 27/14; F02C 7/32; F05D 2260/4031
USPC ....... 244/53 R–55, 58, 60; 74/11, 15.2, 15.4, 74/15.69, 15.8–15.88, 665 GA, 665 GC, 74/665 H, 416, 421 R, 421 A
See application file for complete search history.

(56) References Cited

U.S. PATENT DOCUMENTS

| | | | | |
|---|---|---|---|---|
| 2,416,689 A | * | 3/1947 | Grady | B64D 35/04 416/129 |
| 4,700,589 A | * | 10/1987 | Coronel | B62D 11/10 180/6.2 |

(Continued)

FOREIGN PATENT DOCUMENTS

| | | |
|---|---|---|
| DE | 20316481 | 3/2005 |
| EP | 0227152 | 7/1987 |

(Continued)

OTHER PUBLICATIONS

French Search Report for French Application No. 1501515, Completed by the French Patent Office on May 6, 2016, 5 Pages.

*Primary Examiner* — Victor L MacArthur
*Assistant Examiner* — Bobby Rushing, Jr.
(74) *Attorney, Agent, or Firm* — Brooks Kushman P.C.

(57) ABSTRACT

A power transmission gearbox having at least one driving gear with spur teeth presenting a large radius. The gearbox includes at least one mechanical outlet drive system suitable for driving an accessory, the mechanical outlet drive system having a gear with face teeth referred to as an "accessory pinion", the accessory pinion presenting a "small" radius (R2) lying orthogonally between each face tooth and its axis of rotation, the small radius (R2) being smaller than the large radius (R1).

19 Claims, 4 Drawing Sheets

(51) Int. Cl.
    *B64D 33/02*     (2006.01)
    *F16H 55/17*     (2006.01)

(56) References Cited

U.S. PATENT DOCUMENTS

| | | | | |
|---|---|---|---|---|
| 5,039,281 A | * | 8/1991 | Johnston | F02C 7/32 417/212 |
| 5,135,442 A | * | 8/1992 | Bossler, Jr. | B64C 27/12 475/1 |
| 5,149,311 A | * | 9/1992 | Luijten | B64C 27/12 244/60 |
| 5,178,028 A | * | 1/1993 | Bossler, Jr. | B64D 35/04 74/416 |
| 5,233,886 A | * | 8/1993 | Bossler, Jr. | F16H 1/12 74/411 |
| 5,247,856 A | * | 9/1993 | Cuypers | B63H 5/10 74/665 F |
| 5,802,918 A | * | 9/1998 | Chen | B64C 27/12 74/409 |
| 6,612,195 B2 | | 9/2003 | Gmirya et al. | |
| 6,666,672 B1 | * | 12/2003 | Steffens | F04C 18/16 418/201.1 |
| 6,676,073 B2 | | 1/2004 | Thomassey | |
| 6,898,975 B2 | * | 5/2005 | Blunt | G01H 1/003 73/593 |
| 7,267,300 B2 | * | 9/2007 | Heath | B64C 15/14 244/12.3 |
| 8,231,345 B2 | * | 7/2012 | Robinson | B60K 11/04 416/155 |
| 2002/0084120 A1 | | 7/2002 | Beasley | |
| 2002/0124671 A1 | * | 9/2002 | Basstein | F16H 1/222 74/410 |
| 2005/0011307 A1 | * | 1/2005 | Gmirya | B64C 27/12 74/665 GA |
| 2007/0137342 A1 | | 6/2007 | Hagihara | |
| 2012/0006137 A1 | * | 1/2012 | Short | F02C 7/32 74/460 |

FOREIGN PATENT DOCUMENTS

EP    0971155    1/2000
FR    2830307    4/2003

\* cited by examiner

POWER TRANSMISSION GEARBOX AND AN AIRCRAFT

CROSS REFERENCE TO RELATED APPLICATION

This application claims priority to French patent application No. FR 15 01515 filed on Jul. 16, 2015, the disclosure of which is incorporated in its entirety by reference herein.

BACKGROUND OF THE INVENTION (1) Field of the Invention

The present invention relates to a power transmission gearbox, and also to an aircraft provided with such a gearbox.

In particular, an aircraft of the rotorcraft type has a rotor contributing to providing the aircraft with at least part of its lift. A helicopter may thus have a rotor that is referred to as its "main" rotor for providing it with lift and with propulsion.

(2) Description of Related Art

In order to set a rotor into rotation, a rotorcraft is provided with a power plant comprising at least one engine.

In addition, a gearbox may be interposed between the engines and a rotor in order to set the rotor in rotation. The gearbox also has the function of driving the rotor at a speed of rotation that is low compared with the high speed of rotation of the engines. By way of illustration, a turboshaft type engine possesses a drive shaft that rotates at a speed of the order of several tens of thousands of revolutions per minute (rpm), while the rotor rotates at a speed lying in the range 250 rpm to 450 rpm, for example.

Thus, a helicopter has at least one engine setting a main gearbox into motion, the main gearbox driving the main rotor in rotation.

In addition, the gearbox may set accessories into motion. Such accessories may include in particular lubrication pumps, hydraulic pumps, compressors, alternators, and fans, for example.

A prior art gearbox presents one mechanical inlet drive system per engine. Each mechanical inlet drive system is thus set into motion by a respective engine.

Furthermore, each mechanical inlet drive system serves to set accessories into motion. The mechanical inlet drive systems also act together to drive a gear that is sometimes referred to as the "coupling" gear.

Conventionally, a gear set comprises two toothed gears that mesh together. The gear having the fewer teeth is usually referred to as the "pinion".

Various types of gear are known.

A gear known as a "spur teeth" gear or "gear with spur teeth" has a top disk substantially parallel to a bottom disk and an edge face extending in elevation from the bottom disk to the top disk. The teeth are then arranged on the edge face of the gear. A bevel spur teeth gear presents the feature of possessing an edge face that is conical in shape.

A gear referred to as a "face teeth" gear is also known. A face teeth gear is described in particular in Document EP 0 227 152. A face teeth gear has a top face and a bottom face together with an edge face extending in elevation from the bottom face to the top face. Teeth are then arranged on the periphery of at least one of the top and bottom faces, the teeth extending in elevation from that face.

The bottom face may be in the form of a bottom disk, and the top face may be in the form of a top disk parallel to the bottom disk.

The face from which the face teeth extend may also have some other shape, in particular it may be conical in shape. For example, the bottom face may be in the form of a bottom disk, while the top face may be in the form of a truncated cone, the face teeth being formed on the conical top face.

A face teeth gear is also known as a "crown gear", or a "contrate gear", or "face gear" or gear with face teeth"

A face gear conventionally meshes with a spur teeth gear that presents a diameter smaller than the diameter of the face gear. The driving member of the gear set as represented by the spur teeth gear thus presents a diameter that is less than the diameter of the driven member of the gear set as represented by the face gear. The face gear is thus used in a gear set having the function of reducing a speed of rotation.

In the above-described prior art gearbox, the coupling gear is a spur teeth gear.

The coupling gear sets at least one speed reduction stage into motion in order to drive a rotor in rotation. Furthermore, the coupling gear may be secured to a shaft for setting lubrication pumps into motion via spur teeth gears.

That teaching is advantageous. Nevertheless, the ever-increasing number of accessories that need to be driven leads to difficulties in designing the power transmission architecture of the gearbox. Specifically, the mechanical inlet drive systems extend longitudinally in order to be connected to accessories. Consequently, gearboxes are tending to present increasing lengths in order to be able to set multiple accessories into motion. Such lengthening of the gearbox tends to reduce its stiffness, and also leads to difficulties of integrating the gearbox on an aircraft.

In addition, each mechanical inlet drive system may have a single shaft driving various accessories. If such a single shaft breaks accidentally, that causes all of the accessories co-operating with that shaft to malfunction.

Furthermore, numerous gear sets are sometimes used for mechanically connecting the accessories to a mechanical inlet drive system, e.g. in order to obtain particular speeds of rotation at the inlet to each accessory. Such numerous gear sets can be heavy, expensive, and difficult to arrange.

Finally, that architecture tends to cause the accessories to be moved away from the gearbox. The casing of each accessory is then not connected directly to the gearbox casing. Under such circumstances, the casing of an accessory can move relative to the gearbox casing. Such relative movement can have harmful consequences on the drive of the accessory by the gearbox because of the stiffness specific to each casing.

In this context, driving accessories by means of a gearbox can lead to difficulties.

The technological background includes Document FR 2 830 307. An inlet pinion driven by a power source engages two face gears. Each face gear is secured to an intermediate pinion, each intermediate pinion meshing with another face gear. That document describes a rocking power transmission gearbox and does not provide teaching dedicated to driving accessories.

Document U.S. Pat. No. 6,612,195 describes a transmission system for dividing inlet mechanical torque into multiple mechanical power transmission paths. Inlet pinions with spur teeth then drive a face gear.

Document EP 0 971 155 describes a system having spur teeth gears driving two face gears on a common axis.

Document US 2002/084120 describes spur teeth gear sets.

Document DE 203 16 481 describes a tractor having gear sets comprising bevel gears and pinions.

Document US 2007/0137342 is also known.

BRIEF SUMMARY OF THE INVENTION

An object of the present invention is thus to propose an alternative power transmission gearbox suitable for driving multiple accessories.

According to the invention, a power transmission gearbox is provided with at least one gear referred to as a "driving" gear that is movable in rotation about an axis of rotation, the driving gear being a gear with spur teeth presenting a minimum radius referred to as the "large" radius lying orthogonally between each spur tooth of the driving gear and the axis of rotation.

Furthermore, the gearbox includes at least one mechanical outlet drive system suitable for driving an accessory, the mechanical outlet drive system comprising a driven gear having face teeth referred to as an "accessory pinion", the accessory pinion being movable in rotation about a drive axis that intersects the axis of rotation, at least one face tooth of the accessory pinion being engaged with at least one spur tooth of the driving gear, the accessory pinion presenting a minimum radius referred to as the "small" radius lying orthogonally between each face tooth of the accessory pinion and the drive axis, the small radius being less than the large radius.

The term "minimum radius" is used to designate the smallest radius between the teeth of a member and the axis about which the member rotates.

Thus, the minimum radius of the driving gear represents the smallest radius between the spur teeth of the driving gear and the axis of rotation of the driving gear. This minimum radius of the driving gear is referred to as the "large" radius because of its size.

Likewise, the minimum radius of an accessory pinion represents the smallest radius between the face teeth of the accessory pinion and the drive axis of the accessory pinion. This minimum radius of an accessory pinion is referred to as the "small" radius because of its size.

The gearbox then has a spur tooth driving gear suitable for being set into rotation by a power plant. The driving gear then has a top face and a bottom face that are connected together in elevation by an edge face, the spur teeth being arranged on the edge face.

The driving gear is said to be "driving" because of its function with respect to a mechanical outlet drive system. Specifically, a driving gear sets a mechanical outlet drive system into motion.

Under such circumstances, at least one mechanical outlet drive system has an accessory pinion with face teeth meshing with the driving gear.

In innovative manner, the gearbox thus has a gear set increasing a speed of rotation comprising a spur tooth driving gear meshing with a face teeth pinion. The driving element of the gear set is a cylindrical gear of large diameter with spur teeth, whereas the driven element is a complementary pinion of smaller diameter with face teeth.

In this configuration, the accessory pinion can move axially along the drive axis without influencing the bearing of the face teeth against the spur teeth. As a result, the gearbox can use rolling bearings that are simpler and less expensive for carrying an accessory pinion.

Furthermore, the axial freedom of the accessory pinions reduces assembly costs. This axial freedom avoids implementing accurate adjustment of the bearing between the teeth of the accessory pinion and the teeth of the driving gear, unlike a bevel gear set with spur teeth.

Furthermore, numerous mechanical gear means are sometimes used for driving accessories with conventional gearboxes. For example, the gearbox may drive one accessory using a given shaft, and another accessory may be driven by the same shaft via mechanical take-off means.

Conversely, a plurality of mechanical outlet drive means of the invention can be engaged directly with the driving gear. In particular, each accessory co-operates with its own mechanical outlet drive system. Such a configuration can present the advantage of minimizing the number of mechanical take-off means. This advantage leads to savings in weight, cost, and to improved reliability and/or maintenance of the system.

Furthermore, the mechanical outlet drive systems are mutually independent. Thus, a failure of one mechanical outlet drive system does not necessarily lead to failure of all of the accessories, unlike a gearbox driving multiple accessories via a single shaft.

Furthermore, conventional gearboxes may include take-off means when the driving gear is a straight spur teeth gear in order to generate an outlet along an axis perpendicular to the axis of rotation of the driving gear.

The invention makes it possible to avoid using such take-off means by using an accessory pinion with face teeth.

In addition, the gearbox may then be relatively compact, unlike prior gearboxes that tend to present considerable length.

Furthermore, the invention makes it possible to fasten the accessories to the gearbox casing. The stiffness of the casing of each accessory is coupled to the stiffness of the gearbox casing. The meshing of the accessories is then well controlled by minimizing any risk of accessories moving relative to the gearbox.

The gearbox of the invention may also include one or more of the following characteristics.

Thus, the gearbox includes at least one speed reduction stage, and said driving gear is, for example, a gear for setting the reduction stage into motion via at least one power transmission shaft.

For example, the gearbox may include at least one gear referred to as a "drive" gear, the drive gear setting a reduction stage into motion via at least one power transmission shaft, each mechanical inlet member being suitable for being driven by an engine. A driving gear having a mechanical outlet drive system is then represented either by the drive gear, or by a gear of said mechanical inlet member and referred to as an "inlet" gear for convenience, or by a gear that is constrained to rotate with said drive gear and referred to as a "complementary" gear for convenience.

A mechanical outlet drive system of the invention may then engage with a driving gear secured to a power transmission shaft that sets a speed reduction stage into motion, i.e. with the drive gear.

Additionally, or alternatively, it is possible by way of example for a mechanical outlet drive system of the invention to engage with a gear setting the drive gear into motion.

Specifically, the gearbox may include at least one mechanical inlet member individually connected to an engine. By way of example, such a mechanical inlet member may comprise an inlet gear that is set into motion by an engine via a mechanical power system. Such a mechanical inlet member then meshes with a drive gear, sometimes referred to as the "coupling" gear. The drive gear then drives at least one speed reduction stage. Under such circumstances, the drive gear and/or an inlet gear mesh(es) with at least one accessory pinion.

This arrangement can be implemented relatively easily by using an accessory pinion having face teeth.

Furthermore, at least one mechanical outlet drive system may have a drive shaft secured to the accessory pinion of the mechanical outlet drive system, the drive shaft being suitable for engaging with an accessory.

For example, a drive shaft extends from one end secured to the face of the accessory pinion that does not have teeth towards another end carrying a pinion or a gear having teeth.

Furthermore, the drive shaft optionally projects outside a casing of the gearbox.

The drive shaft may then be mechanically connected to an accessory.

In another aspect, the gearbox may include a plurality of mechanical outlet drive systems distributed in azimuth around the driving gear.

This ability to distribute the mechanical outlet drive systems in azimuth around a driving gear makes it easier to arrange the mechanical outlet drive systems in a congested environment.

Under such circumstances, the mechanical outlet drive systems meshing with the same driving gear may optionally be uniformly distributed in azimuth around the driving gear.

The term "uniformly distributed in azimuth" means that the mechanical outlet drive systems are arranged around the circumference of the driving gear at a constant spacing angle. Under such circumstances, the angle between two adjacent mechanical outlet drive systems is equal to an angle of 360 degrees divided by the number of mechanical outlet drive systems engaged with the driving gear. By way of illustration, three mechanical outlet drive systems meshing with the same driving gear are separated in pairs by an angle of 120 degrees.

Furthermore, at least two accessory pinions of two mechanical outlet drive systems are optionally offset from each other in elevation, one accessory pinion rotating in a counterclockwise direction and the other accessory pinion rotating in a clockwise direction.

The direction of rotation of accessory pinions is thus adapted as a function of the position of the accessory pinion relative to the driving gear. An accessory pinion arranged substantially above the driving gear thus rotates in a direction opposite to the direction of rotation of an accessory pinion arranged substantially beneath the driving gear.

In addition to a gearbox, the invention provides a power transmission architecture fitted with such a gearbox and at least one accessory. At least one, and possibly each, accessory is then connected to a mechanical outlet drive system.

In particular, each accessory is connected to its own mechanical outlet drive system, which is dedicated to that accessory. A failure of a mechanical outlet drive system then has an impact only for the accessory that is connected to mechanical outlet drive system that has failed.

In addition, the gearbox includes a casing referred to as the "gearbox" casing, each driving gear and each accessory pinion being arranged in the gearbox casing, at least one accessory including a casing referred to as an "accessory" casing fastened to the gearbox casing.

Other accessories may have respective accessory casings that are connected to the gearbox casing indirectly.

Optionally, each accessory has an accessory casing that is fastened to the gearbox casing.

Furthermore, the invention provides an aircraft including a rotor. The aircraft has such a power transmission architecture with the rotor being driven in rotation by the gearbox.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

DETAILED DESCRIPTION OF THE INVENTION

Elements present in more than one of the figures are given the same references in each of them.

Figure 1:
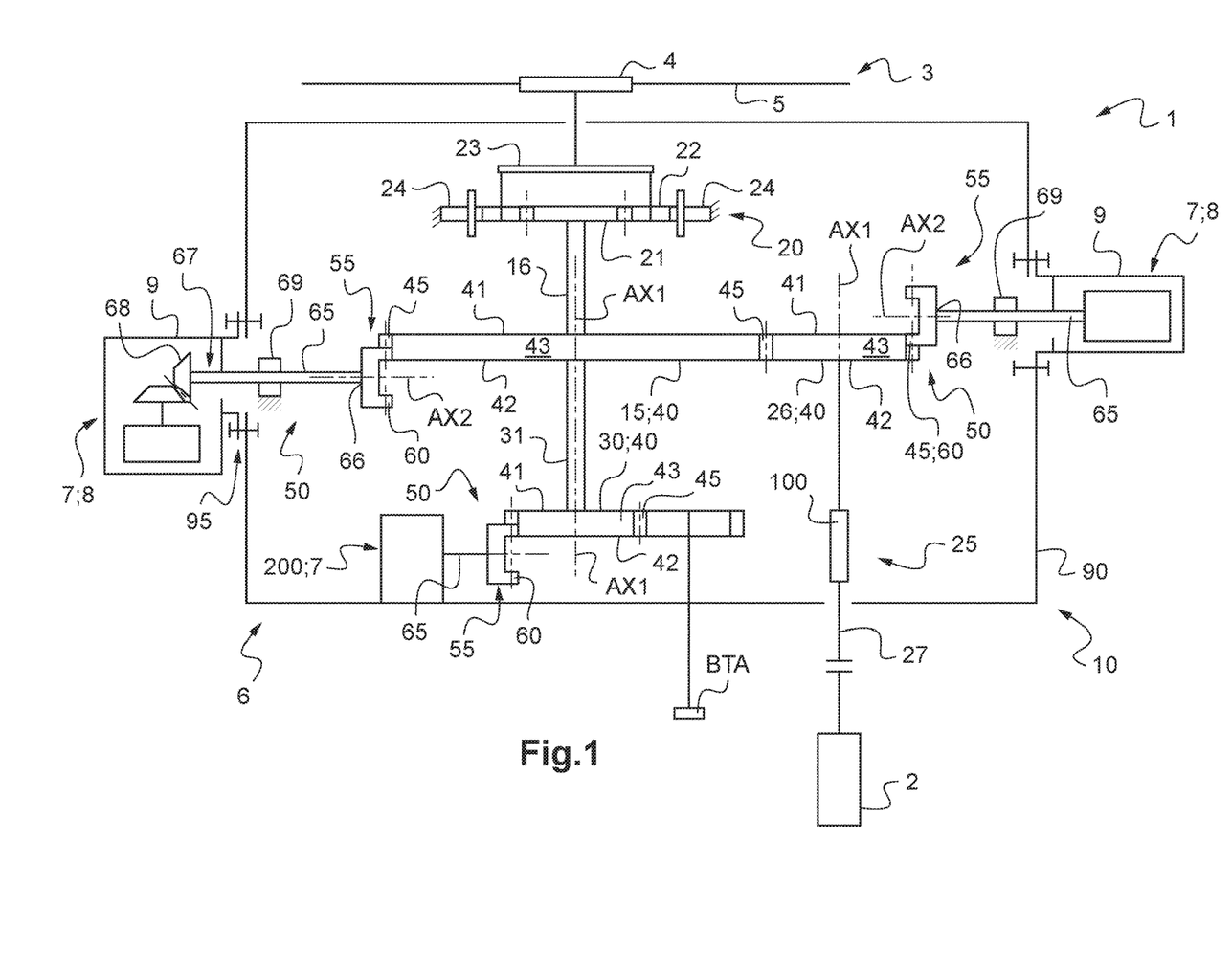
FIG. 1 is a diagram showing an aircraft of the invention.

FIG. 1 shows an aircraft 1 of the invention. This aircraft includes a power transmission architecture 6.

In particular, the power transmission architecture 6 is set into motion by at least one engine 2. Under such circumstances, the power transmission architecture 6 drives a rotor 3 in rotation. Such a rotor 3 may have a hub 4 carrying blades 5 serving at least to participate in providing the aircraft 1 with lift and/or propulsion.

The power transmission architecture 6 is thus provided with a gearbox 10 set into motion by at least one engine 2. The gearbox 10 is also mechanically connected to the rotor 3 that is to be driven.

Under such circumstances, the gearbox comprises, within a gearbox casing 90, a drive gear 15 setting into motion at least one speed reduction stage 20. For example, the speed reduction stage comprises a sun gear 21 constrained to rotate with the drive gear 15 by a power transmission shaft 16. The sun gear meshes with at least one planet gear 22 running along a peripheral ring gear 24. Each planet gear is also carried by a planet carrier 23. The planet carrier may be mechanically connected to the rotor that is to be driven, as shown in FIG. 1, or it may be connected to another speed reduction stage.

The drive gear 15 may also be driven in rotation indirectly about an axis of rotation by each engine. Thus, the gearbox is provided with one mechanical inlet member 25 for each engine. Each mechanical inlet member 25 is provided with at least one "inlet" gear 26 that meshes with the drive gear 15. The mechanical inlet member may also have an overrunning clutch or "freewheel" 100.

Furthermore, the mechanical inlet member 25 may include at least one shaft 27 suitable for being mechanically connected to an engine 2. A shaft 27 may be secured to an inlet gear or it may mesh with an inlet gear, e.g. via gearing having conical spur teeth.

Each inlet gear 26 is then received in the gearbox casing 90, the shaft 27 projecting from the gearbox casing 90 in order to be connected to an engine 2.

Furthermore, the gearbox 10 may possess at least one additional gear referred to as a "complementary" gear 30 that is arranged in the gearbox casing 90. The complementary gear is then constrained to rotate with the drive gear 15 by a link shaft 31.

A complementary gear may also drive mechanically an auxiliary gearbox BTA, in particular a tail gearbox of a rotorcraft.

In addition, the power transmission architecture 6 includes at least one accessory 7 that is set into motion via a rotary member of the gearbox 10. These accessories may in particular include lubrication pumps, hydraulic pumps, compressors, alternators, and fans.

In order to enable each accessory 7 to operate, the gearbox 10 has one outlet mechanical drive system 50 for each accessory 7. Each accessory 7 is then set into motion by a single mechanical outlet drive system 50, each mechanical outlet drive system 50 setting a single accessory 7 into motion.

Each mechanical outlet drive system 50 meshes with a gear referred to as the "driving" gear 40. In the example of FIG. 1, the drive gear 15, an inlet gear 26 and/or also the complementary gear 30 may be "driving" gears setting into motion at least one mechanical outlet drive system 50.

Figure 2:
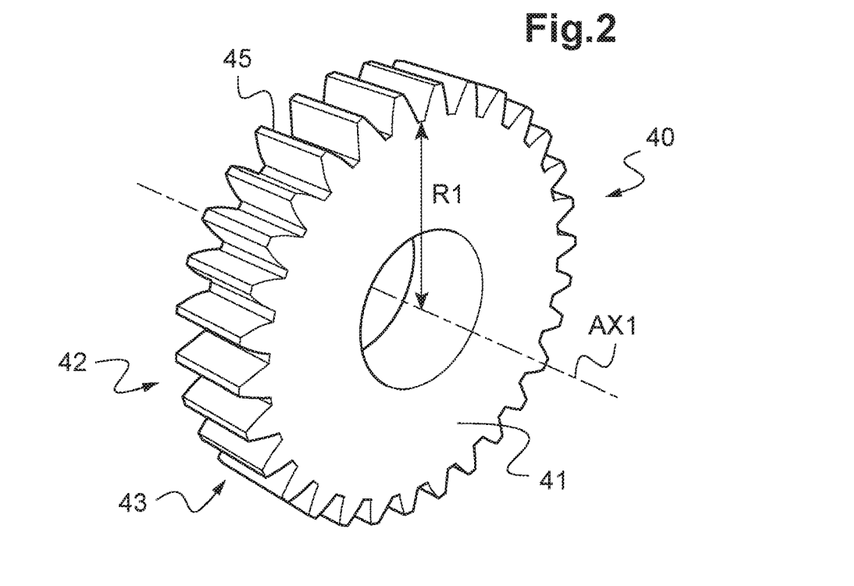
FIGS. 2 and 3 are diagrams showing spur gears respectively with straight teeth and with helical teeth.
Figure 3:
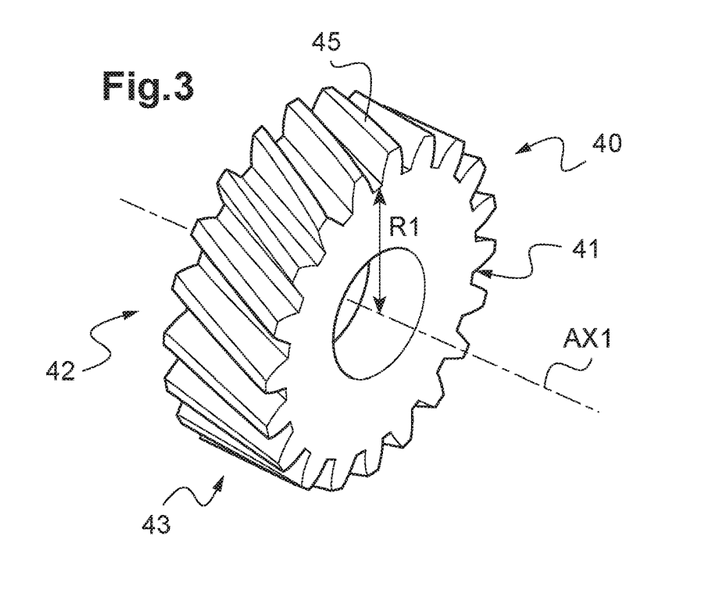

With reference to FIGS. 2 and 3, each driving gear 40 is a gear with spur teeth 45 that is movable in rotation about an axis of rotation AX1.

Under such circumstances, a driving gear 40 comprises a block of material presenting a top disk 41, possibly parallel to a bottom disk 42. In addition, the driving gear has an edge face 43 that extends in elevation along the axis of rotation AX1 from the bottom disk 42 to the top disk 41.

Teeth 45, known as "spur" teeth, are then arranged on the edge face 43 of the driving gear 40.

As shown in FIG. 2, the spur teeth 45 may be straight. Each spur tooth 45 is then contained in a plane containing the axis of rotation AX1.

As shown in FIG. 3, the spur teeth 45 may be helical teeth.

Whatever the variant, a driving gear presents a minimum radius referred to as the "large" radius R1. The large radius R1 of a driving gear represents the smallest radius of a disk between a tooth and the axis of rotation AX1. Consequently, the large radius R1 is the radius of the bottom disk 42 or of the top disk 41.

With reference to FIG. 1, a mechanical outlet drive system 50 also comprises an accessory pinion 55 meshing with a driving gear 40.

An accessory pinion 55 is a face tooth gear movable in rotation about a drive axis AX2. This drive axis AX2 intersects the axis of rotation AX1 of the corresponding driving gear.

Figure 4:
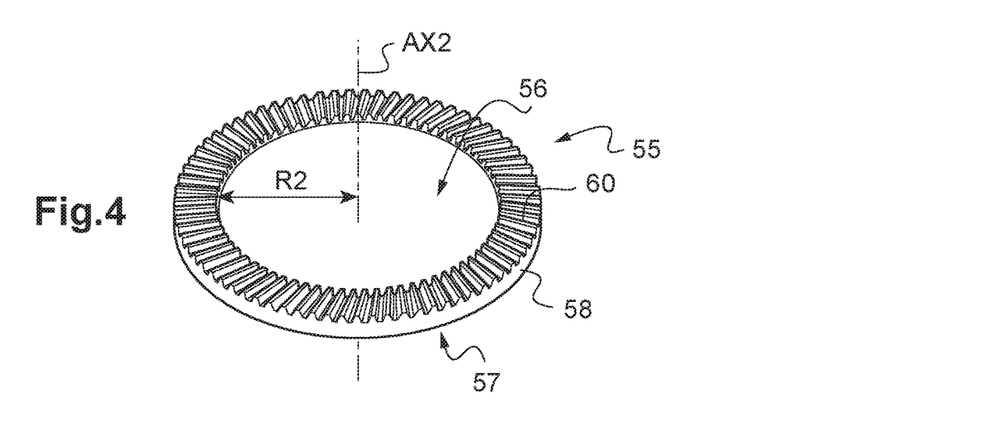
FIGS. 4 and 5 are diagrams showing face pinions respectively with straight teeth and with helical teeth.
Figure 5:
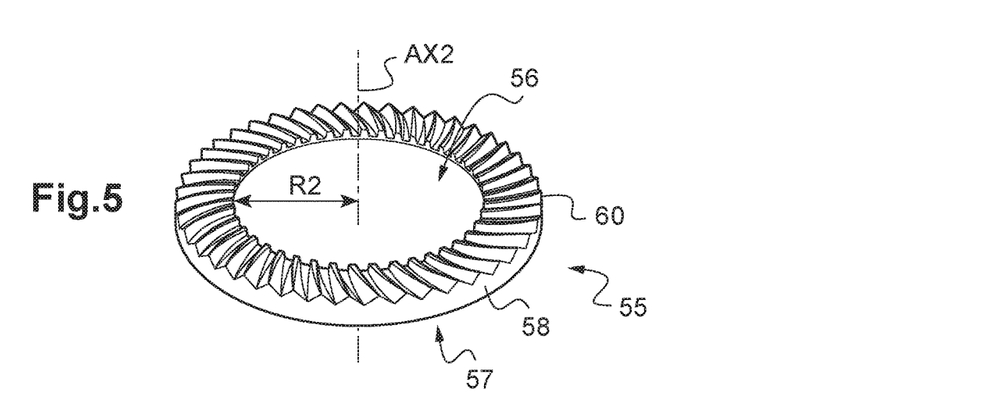

With reference to FIGS. 4 and 5, an accessory pinion 55 comprises a block of material presenting a top face 56 optionally parallel to a bottom face 57. Furthermore, an accessory pinion 55 includes an edge face 58 that extends in elevation along the drive axis AX2 from the bottom face 57 to the top face 56 of the accessory pinion 55.

Teeth referred to as "face" teeth 60 are then provided on one face. In the example shown, face teeth extend in elevation from the top face 56. These face teeth 60 also present a surface that is ruled.

As shown in FIG. 4, the face teeth 60 may be straight teeth. Each tooth extends along a straight line, which straight line does not necessarily intersect the drive axis AX2.

As shown in FIG. 5, the face teeth 60 may be helical teeth.

Whatever the variant, an accessory pinion 55 presents a minimum radius referred to as the "small" radius R2. The small radius R2 of an accessory pinion 55 represents the smallest radius between a tooth and the drive axis AX2.

With reference to FIG. 1, at least one face tooth of an accessory pinion then comes into contact with at least one spur tooth of a driving gear.

Furthermore, the small radius R2 of an accessory pinion 55 is smaller than the large radius R1 of the driving gear that meshes with the accessory pinion 55.

Figure 6:
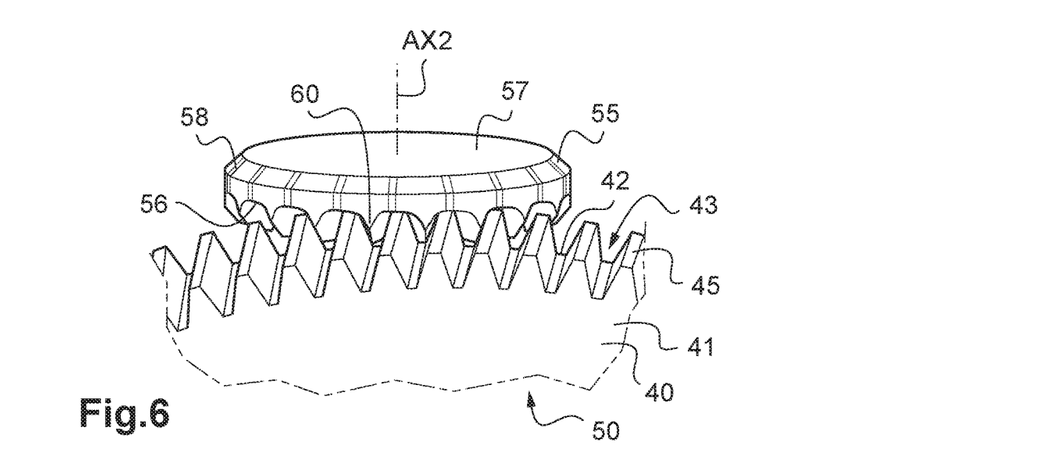
FIG. 6 is a diagram showing a driving gear with face teeth that is set into motion by a driving gear with spur teeth.

With reference to FIG. 6, a driving gear 40 having spur teeth 45 meshes with an accessory pinion 55 having face teeth, thereby constituting a gear set that increases speed of rotation.

Each accessory pinion may then be used directly or indirectly to set an accessory into motion.

For example, a mechanical outlet drive system 50 comprises a drive shaft 65 constrained to rotate with the accessory pinion 55 of the mechanical outlet drive system 50. The drive shaft 65 may be carried by a bearing 69 that may be a smooth bearing or a rolling bearing.

The drive shaft 65 of a mechanical outlet drive system 50 then extends from a first end 66 secured to the accessory pinion 55 to a second end 67. The second end 67 may include a straight or conical pinion 68 to set an accessory 7 into motion. Nevertheless, an accessory does not necessarily include mechanical take-off means.

The drive shaft of a mechanical outlet drive system 50 may extend entirely inside the gearbox casing 90 in order to engage an accessory. For example, such a mechanical outlet drive system 50 may mesh with the complementary gear 30 in order to drive an accessory 7 of the type comprising a lubrication pump 200, for example.

Nevertheless, the drive shaft of a mechanical outlet drive system 50 may project out from the gearbox casing 90 to reach an accessory referred to as an "external" accessory 8 situated outside the gearbox. By way of example, such an accessory may be a fan in the example of FIG. 1.

For example, the drive shaft passes for this purpose through an opening in the gearbox casing 90. Such an opening may also provide an operator with access to the inside of the gearbox.

Furthermore, at least one accessory may be fastened to the gearbox.

Specifically, mechanical outlet drive systems 50 make it possible to arrange accessories close to the gearbox. Under such circumstances, an accessory casing 9 for an accessory may be fastened by conventional means 95 to the gearbox casing 90. By way of example, such means 95 may comprise reversible fastener means, such as screw fasteners, in particular.

Figure 7:
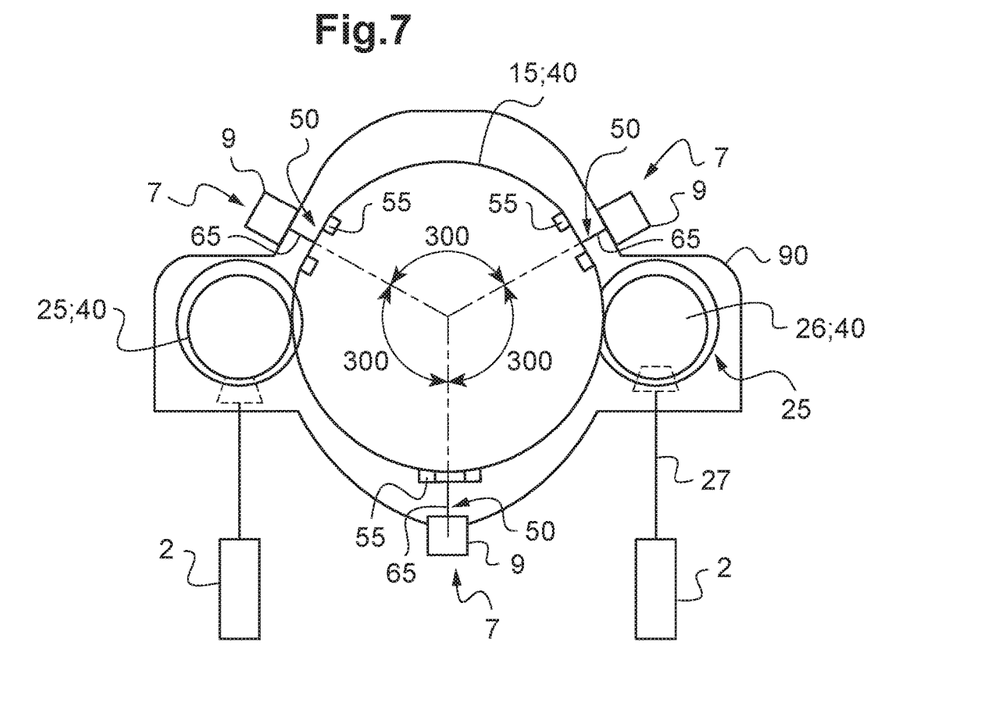
FIG. 7 is a diagram showing accessory pinions uniformly distributed in azimuth around a driving gear.

FIG. 7 shows an embodiment of a gearbox.

The gearbox has a drive gear 15. The drive gear 15 is set into rotation jointly by two mechanical inlet members 25 that are connected respectively to two engines 2. Each mechanical inlet member 25 comprises at least one inlet gear 26 and a shaft 27, for example.

Independently of the way in which the drive gear 15 is driven in rotation about its axis of rotation AX1, a driving gear may engage with a plurality of mechanical outlet drive systems 50.

In the embodiment of FIG. 7, three mechanical outlet drive systems 50 mesh with the drive gear 15 for the purpose of setting three respective accessories 7 into motion.

Under such circumstances, the mechanical outlet drive system 50 may optionally be uniformly distributed in azimuth around the drive gear 15. Two adjacent mechanical outlet drive systems 50 are then spaced apart by an angle 300 of 120 degrees. More precisely, two drive shafts 65 of two adjacent mechanical outlet drive systems 50 extend respectively on two axes that are spaced apart by an angle 300.

Figure 8:
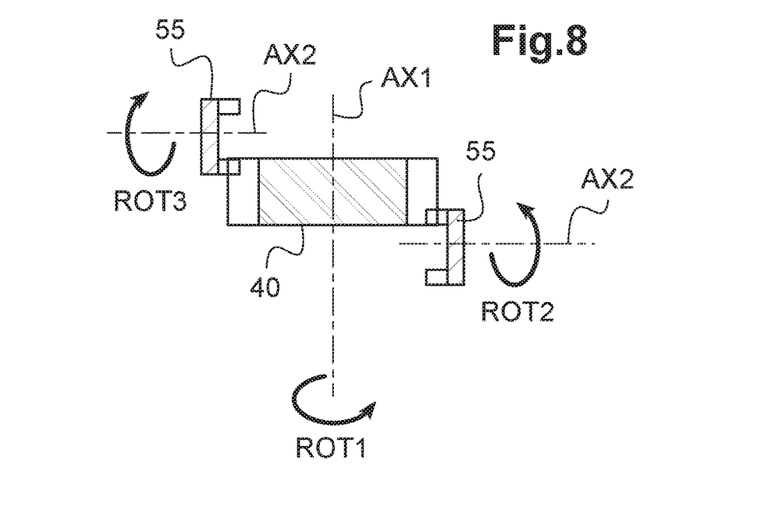
FIG. 8 is a diagram showing two accessory pinions that are offset vertically.

Furthermore, and as shown in FIG. 8, the direction of rotation of an accessory pinion may be adjusted by positioning the accessory pinion above or below the driving gear that is meshing with the accessory pinion.

An accessory pinion is positioned above such a driving gear when the drive axis AX2 about which the accessory pinion 55 rotates overlies the driving gear A. Conversely, an accessory pinion is positioned below such a driving gear when the driving gear overlies the drive axis AX2 about which the accessory pinion 55 rotates.

Consequently, when two accessory pinions 55 of two mechanical outlet drive systems 50 are offset relative to each other in elevation, one accessory pinion 55 rotates in a counterclockwise direction and the other accessory pinion 55 rotates in a clockwise direction.

Naturally, the present invention may be subjected to numerous variations as to its implementation. Although a plurality of embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A power transmission gearbox having at least one driving spur gear that is movable in rotation about an axis of rotation, the driving spur gear with spur teeth and having a first radius lying orthogonally between each spur tooth of the driving spur gear and the axis of rotation, wherein the gearbox includes at least one mechanical outlet drive system suitable for driving an accessory, the mechanical outlet drive system comprising a driven face gear configured as an accessory pinion with face teeth, the face gear being movable in rotation about a drive axis that intersects the axis of rotation, at least one face tooth of the face gear being engaged with at least one spur tooth of the driving spur gear, the face gear having a second radius lying orthogonally between each face tooth of the face gear and the drive axis, the second radius being less than the first radius;
    wherein the gearbox includes at least one speed reduction stage suitable for driving a rotor, and the driving spur gear is a gear for setting the speed reduction stage into motion via at least one power transmission shaft, the at least one power transmission shaft movable in rotation about the axis of rotation of the driving spur gear and directly coupled to the driving spur gear and a gear of the speed reduction stage.

2. A gearbox according to claim 1, wherein the gearbox includes at least one mechanical inlet member engaged with a drive gear, the drive gear setting the speed reduction stage into motion via the at least one power transmission shaft, each mechanical inlet member being suitable for being driven by an engine, the driving spur gear being represented either by the drive gear, or by an inlet gear of the mechanical inlet member, or by a complementary gear constrained to rotate with the drive gear.

3. A gearbox according to claim 1, wherein at least one mechanical outlet drive system has a drive shaft secured to the face gear of the mechanical outlet drive system, the drive shaft being suitable for engaging with an accessory, the drive shaft suitable for rotation about the drive axis.

4. A gearbox according to claim 3, wherein the drive shaft projects outside a casing of the gearbox.

5. A gearbox according to claim 1, wherein the gearbox includes a plurality of mechanical outlet drive systems distributed in azimuth around the driving spur gear.

6. A gearbox according to claim 5, wherein the mechanical outlet drive systems are uniformly distributed in azimuth around the driving spur gear.

7. A gearbox according to claim 1, wherein at least two face gears of two mechanical outlet drive systems are offset from each other in elevation, one face gear rotating in a counterclockwise direction and the other face gear rotating in a clockwise direction.

8. A power transmission architecture having a gearbox and at least one accessory, wherein the gearbox is according to claim 1, at least one accessory being connected to a mechanical outlet drive system.

9. A power transmission architecture according to claim 8, wherein the gearbox includes a gearbox casing, each driving spur gear and each face gear being arranged in the gearbox casing, at least one accessory including an accessory casing fastened to the gearbox casing.

10. A power transmission architecture according to claim 8, wherein each accessory is connected to its own mechanical outlet drive system, which is dedicated to that accessory.

11. An aircraft including a rotor, wherein the aircraft includes a power transmission architecture according to claim 8, the rotor being driven in rotation by the gearbox.

12. A gearbox according to claim 1, wherein the face gear has a top face, a bottom face, and an edge face extending in elevation along the axis of rotation, the edge face positioned between and connecting the top face to the bottom face, the face teeth of the face gear extending in elevation from the top face.

13. A gearbox according to claim 12, wherein the driving spur gear has a top disk, a bottom disk, and an edge face extending in elevation along the axis of rotation, the edge face positioned between and connecting the top disk to the bottom disk, the edge face defining the spur teeth of the driving spur gear.

14. The gearbox according to claim 13, wherein the face gear is configured to move axially without influencing a bearing of the face teeth of the face gear against the spur teeth of the driving spur gear.

15. A power transmission gearbox for a rotorcraft, the gearbox comprising:
    a driving spur gear rotating about an axis of rotation, the driving spur gear having a top disk, a bottom disk, and an edge face extending in elevation along the axis of rotation, the edge face positioned between and connecting the top disk to the bottom disk, the edge face defining spur teeth of the driving spur gear, wherein the driving spur gear has a first radius lying orthogonally between each spur tooth of the driving spur gear and the axis of rotation;
    a speed reducing stage for driving a rotor of the rotorcraft, the speed reducing stage having a plurality of gears;
    a power transmission shaft directly coupled to the driving spur gear and to one of the plurality of gears of the speed reducing stage, the power transmission shaft constrained for rotation with the driving spur gear and the one of the plurality of gears of the speed reducing stage, the power transmission shaft rotating about the axis of rotation; and
    a mechanical outlet drive system for driving an accessory, the drive system having a driven face gear rotating about a drive axis and configured as an accessory pinion, the face gear having a top face, a bottom face, and an edge face extending in elevation along the drive axis, the edge face positioned between and connecting the top face to the bottom face, the face gear having face teeth extending in elevation from the top face, wherein the face gear has a second radius lying orthogonally between each face tooth of the face gear and the drive axis, the second radius being less than the first radius, wherein the drive axis intersects the axis of rotation, and wherein at least one face tooth of the face gear is in meshed engagement with at least one spur tooth of the driving spur gear.

16. The power transmission gearbox according to claim 15 wherein the face gear is configured to move axially without influencing a bearing of the face teeth of the face gear against the spur teeth of the driving spur gear.

17. The power transmission gearbox of claim 15 further comprising another mechanical outlet drive system for driving another accessory, the another drive system having another driven face gear rotating about another drive axis and configured as another accessory pinion, the another face gear having another top face, another bottom face, and another edge face extending in elevation along the another drive axis, the another edge face positioned between and connecting the another top face to the another bottom face, the face teeth of the another face gear extending in elevation from the another top face, wherein the another face gear has another radius lying orthogonally between each face tooth of the another face gear and the another drive axis, the another radius being less than the first radius, wherein the another drive axis intersects the axis of rotation, and wherein at least one face tooth of the another face gear is in meshed engagement with at least one spur tooth of the driving spur gear.

18. The power transmission gearbox of claim 17 wherein the face gear and the another face gear are axially offset and spaced apart from one another along the axis of rotation of the driving spur gear such that the driving spur gear is positioned between and spaced apart from the drive axis of the face gear and the another drive axis of the another face gear, and the axis of rotation of the driving spur gear intersects both the the drive axis and the another drive axis.

19. A power transmission gearbox for a rotorcraft, the gearbox comprising:
   a driving spur gear rotating about an axis of rotation, the driving spur gear having a top disk, a bottom disk, and an edge face extending in elevation along the axis of rotation, the edge face positioned between and connecting the top disk to the bottom disk, the edge face defining spur teeth of the driving spur gear, wherein the driving spur gear has a first radius lying orthogonally between each spur tooth of the driving spur gear and the axis of rotation; and
   a mechanical outlet drive system for driving an accessory, the drive system having a driven face gear rotating about a drive axis and configured as an accessory pinion, the face gear having a top face, a bottom face, and an edge face extending in elevation along the drive axis, the edge face positioned between and connecting the top face to the bottom face, the face gear having face teeth extending in elevation from the top face, wherein the face gear has a second radius lying orthogonally between each face tooth of the face gear and the drive axis, the second radius being less than the first radius, wherein the drive axis intersects the axis of rotation, and wherein at least one face tooth of the face gear is in meshed engagement with at least one spur tooth of the driving spur gear;
   wherein the face gear is configured to move axially without influencing a bearing of the face teeth of the face gear against the spur teeth of the driving spur gear.

* * * * *